United States Patent
Kloppe et al.

[11] 3,768,824
[45] Oct. 30, 1973

[54] STEERING WHEEL WITH SAFETY AIR CUSHION

[75] Inventors: Herbert Kloppe, Cologne; Dieter Pfadenhauer, Pulheim, both of Germany

[73] Assignee: Ford Motor Company, Dearborn, Mich.

[22] Filed: Feb. 10, 1972

[21] Appl. No.: 225,130

[30] Foreign Application Priority Data
Feb. 27, 1971 Germany................... P 21 09 463.3

[52] U.S. Cl.......................... 280/87 R, 280/150 AB
[51] Int. Cl............................................. B60r 21/08
[58] Field of Search................... 280/150 AB, 87 R

[56] References Cited
UNITED STATES PATENTS

| | | |
|---|---|---|
| 3,674,284 | 7/1972 | Lohr............................ 280/150 AB |
| 3,625,543 | 12/1971 | Wolff............................ 280/150 AB |
| 3,532,360 | 10/1970 | Leising et al................. 280/150 AB |
| 3,632,135 | 1/1972 | Chute et al.................... 280/150 AB |
| 3,680,884 | 8/1972 | Stephenson................... 280/150 AB |
| 3,588,142 | 6/1971 | Gorman........................ 280/150 AB |

Primary Examiner—Benjamin Hersh
Assistant Examiner—Leslie J. Paperner
Attorney—Keith L. Zerschling et al.

[57] ABSTRACT

Steering wheel with safety air bag for motor vehicles whereby the air bag is positioned within the continuous spoke of the steering wheel. The folded or collapsed air bag is arranged within a deformable air bag housing which together with a cover forms a unit which with a gas generator may be preassembled and installed into the recess between the angularly inclined sections of the continuous steering wheel spoke.

2 Claims, 2 Drawing Figures

Patented Oct. 30, 1973
3,768,824
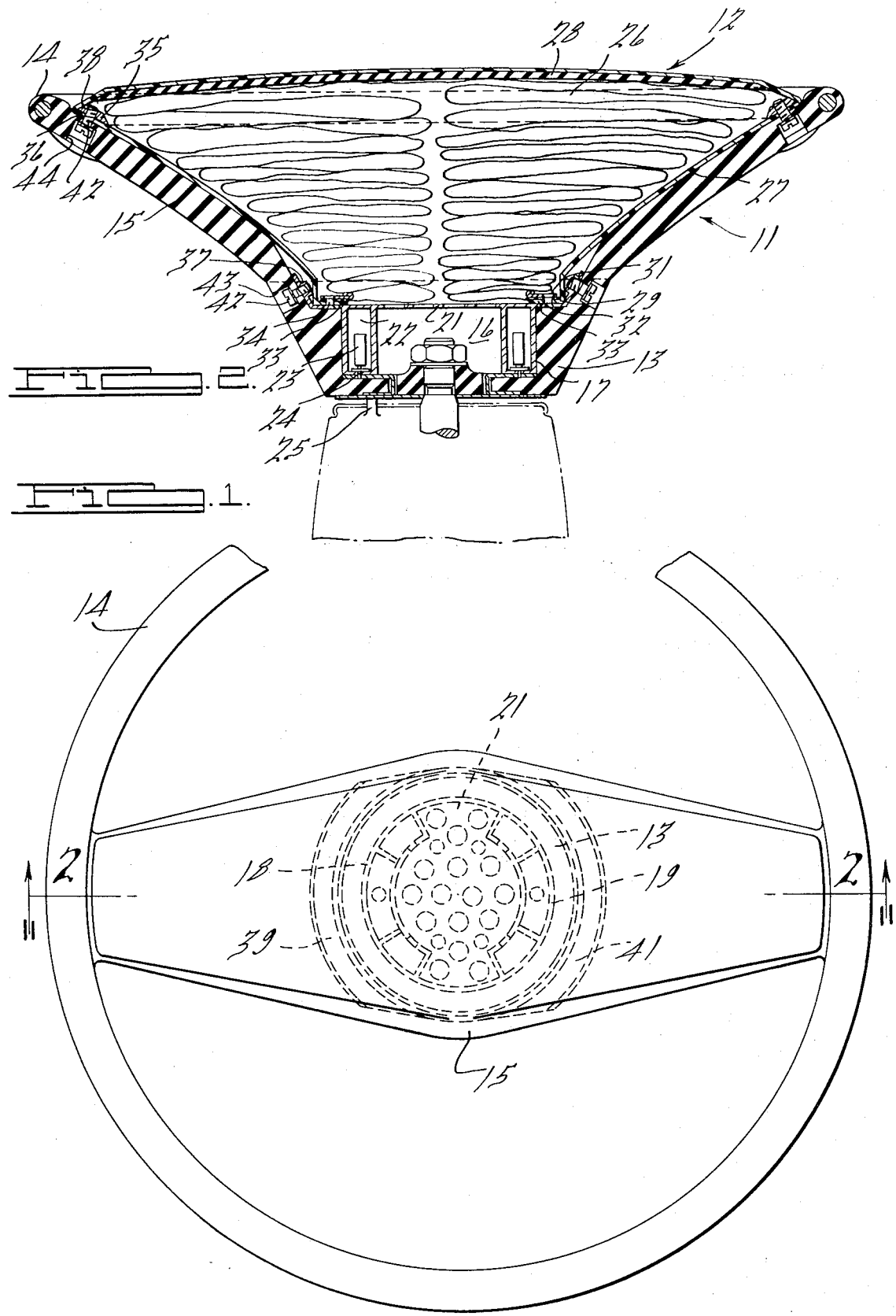

STEERING WHEEL WITH SAFETY AIR CUSHION

BACKGROUND OF THE INVENTION

There are already known steering wheels, in particular for motor vehicles, that are provided with air cushions designed to convert from a folded inoperative position into an inflated operative position in order to cushion the vehicle operator in the event of a collision. The air cushion in its folded condition is connected through its bottom edge to a gas generator housing equipped with a diffuser section and attached to the steering wheel hub. The cushion is located in a recess in a continuous steering wheel spoke and is held in position by a cover which has deliberate weak points.

The recess which accommodates the air cushion is formed by a V-shaped base and triangular raised side walls, which extend up to the level of the steering wheel rim, of a continuous wheel spoke. Into this funnel-like recess, the gas generator housing and the air cushion must be fitted at the time of assembly and attached in position, the air cushion being held in position by the application of a cover to the edge of the steering wheel spoke.

The known steering wheels have the drawback that the assembly in the funnel-like recess of the devices required by the safety air cushion is difficult and has to be carried out directly in the steering wheel. Furthermore, the raised triangular side walls of the steering wheel spoke, which walls extend up to the height of the steering wheel rim, constitute serious danger to the driver because of the relatively hard material of which they are made, and because the air cushion is not inflated below a certain collision speed.

The object of the present invention is so to improve a steering wheel of the kind introductorily described that the assembly of the safety air cushion of the devices associated therewith is substantially simplified and can be carried out independently of the steering wheel. Furthermore, the risk of injury to the driver, presented by raised side walls on the steering wheel spoke, is avoided.

SUMMARY OF THE INVENTION

In accordance with the invention, this object is achieved in that a folding air cusion is positioned in a deformable housing connected to a gas generator housing and a cover to form a preassembled unit which is attached to the continuous V-shaped steering wheel spoke.

The air cushion housing here preferably consists of a synthetic material, has a funnel shape and is easily deformable. It is attached through a bottom flange edge and a clamping ring which simultaneously fixes the bottom edge of the air cushion to a radial flange on the gas generator housing. The upper edge of the funnel-shaped housing is fastened through an upper thickened edge to the cover by snap or interlocking fasteners.

The preassembled unit constituted by the gas generator housing, the air cushion housing containing the folded air cushion, and the cover, is attached to the V-shaped steering wheel spoke through apertures formed in lateral lugs of a radial flange on the gas generator housing and in a thickened edge of the air cushion deformable housing using screws countersunk in holes formed in the steering wheel spoke.

Self-evidently, the external surfaces of the air cushion housing can be matched in color and finish to the trim and upholstery, the covering of the spoke, or the steering wheel.

The steering wheel designed for the installation of a safety air cushion unit will preferably be provided with contacts through which on installation it is connected with leads which go to a trigger device.

DESCRIPTION OF THE DRAWING

The invention will be explained in more detail making reference to an example illustrated in the attached drawing.

FIG. 1 illustrates a plan view of a steering wheel in accordance with the invention, with a safety air cushion unit.

FIG. 2 illustrates a section on the line 2—2 of FIG. 1.

A steering wheel 11 provided for the installation of a safety air cusion unit, generally designated 12 in accordance with the invention, consists of a hub 13, a rim 14, and a continuous, V-shaped spoke 15.

The steering wheel hub 13 contains a cylindrical recess 16 in which a solid-gas generator housing 17 of multi chamber type, is located. The gas generator housing 17 is split into two semi-circular three-chamber zones 18 and 19 which are connected with one another through the base of the housing 17, the latter being designed as a diffuser section 21. The central chamber of each three-chamber zones 18 and 19 is provided with a charge 22 and a detonator 23. The detonators 23 are connected through contacts 24 in the steering wheel hub 13, with leads 25 which go to a trigger or sensor device (not shown). If the charges 22 are ignited by the detonators 23, then the resultant hot gas flow is first of all forced into the lateral chambers and thence into the space 16 within the hub 13 and out through the diffuser section 21 into the air cushion 26.

The folded air cushion 26 is arranged in an easily deformable air cushion housing 27 attached to the gas generator housing 17 and a cover 28 to form a preassembled unit fixed to the continuous, V-shaped steering wheel spoke 15. The easily deformable air cushion housing 27 consists of synthetic material and is funnel-shaped. By means of a bottom flanged edge 29 it is attached through a clamping ring 31 which simultaneously locates the bottom edge 32 of the air cushion 26 to the radial flange 33 of the gas generator housing 17 by means of rivets 34 and is attached through an upper, thickened edge 35 to the cover 28 by a snap or interlocking fastener 36.

The preassembled unit 12 constituted by the gas generator housing 17, the air cushion housing 27 with the folded air cushion 26, and the cover 28, is attached to the V-shaped steering wheel spoke 15 through mounting holes 37 and 38 formed in lateral lugs 39 and 41 of the radial flange 33 of the housing 17, and in the thickened edge 35 of the cover 28 by means of screws 42 countersunk in holes 43 and 44.

The assembly of the safety air cushion unit 12 in accordance with the invention, which consists essentially of the gas generator housing 17, the air cushion 26, the air cushion housing 27 and the cover 28 can be carried out relatively simply and independently of the steering wheel 11.

A steering wheel 11 provided with the holes 43 and 44 for the fixing screws 42 can quickly and simply be fitted with a safety air cushion unit but can also be equally well fitted with a simple, conventional safety cushion.

Self-evidently, the cover 28 is provided in the conventional manner with deliberate weak points (not visible) which, in the event that the cushion 26 is inflated, rupture and allow the cushion 26 to deploy freely.

The screw holes can preferably be closed off by soft plastic caps in order to give the underside of the steering wheel spoke a smooth surface.

The provision, in accordance with the invention, of a safety air cushion in the form of a completely preassembled unit within a steering wheel, achieves the following advantage:

The assembly of the device is required for the safety air cushion unit can be carried out simply and independently of the steering wheel.

A safety air cushion unit can be assembled simply and rapidly in a steering wheel designed for the purpose.

A safety air cushion unit installed in the steering wheel can, where there is a suspected fault or after a specific period of service, be rapidly and easily dismantled and replaced by a new unit.

It is quite simple, in a steering wheel designed for the installation of a safety air cushion unit, to arrange a conventional, easily deformable safety cushion, this giving the advantage from the mass production point of view, that in a vehicle model equipped with the same steering wheel, on the one hand conventional safety cushions can be fitted and on the other, for example, for certain export countries, inflatable safety air cushion units fitted instead. This advantage also, of course, enables the arbitary installation of a safety air cushion as a special extra.

In addition, the easily deformable air cushion housing removes the risk of injury to the driver in the event that the inflation of the safety air cushion does not take place until a specific collision speed is reached. In this case, the easily deformable air cushion housing, with the cover and the folded air cushion, acts like a conventional safety cushion.

The invention disclosure may have many modifications apparent to those skilled in the art in view of the teachings of this specification. It is intended that all modifications which fall within the true spirit and scope of this invention be included within the scope of the appended claims.

We claim:

1. In combination, a steering wheel having a hub, a rim and angularly inclined spoke sections supporting the rim above the hub,
    an air cushion having a folded inoperative position and an inflated position in which, in the event of a collision, it is operative to cushion the driver from the steering wheel,
    and a gas generator housing equipped with a diffuser section located in a recess at the base of the steering wheel spoke sections and attached to the steering wheel hub,
    the cushion in its folded position being connected at its bottom edge to the diffuser section and being held in position by a cover having deliberate weak points,
    characterized in that the foldable air cushion is housed when folded in a deformable synthetic material housing connected to the gas generator housing and the cover to form a preassembled unit which is attached to the angularly inclined steering wheel spoke sections,
    the deformable housing having a funnel shape and being attached through a bottom flanged edge and a clamping ring which simultaneously fixes the bottom edge of the air cushion to a radial flange on the gas generator,
    the upper edge of the funnel-shaped housing being thickened and attached to the cover by fasteners.

2. In combination, as claimed in claim 1, characterized in that the preassembled unit comprising the gas generator housing, the air cushion deformable housing containing the folded air cushion and the cover is attached to the steering wheel spoke sections through apertures formed in lateral lugs of the radial flange of the gas generator housing and in the thickened edge of the air cushion deformable housing by means of screws which are countersunk in holes in the steering wheel spoke sections.

* * * * *